US006597687B1

(12) United States Patent
Rao

(10) Patent No.: US 6,597,687 B1
(45) Date of Patent: Jul. 22, 2003

(54) METHOD AND APPARATUS FOR SWITCHING VOICE CALLS USING A COMPUTER SYSTEM

(75) Inventor: Vijay M. Rao, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/105,692

(22) Filed: Jun. 26, 1998

(51) Int. Cl.[7] ............................................... H04L 12/66
(52) U.S. Cl. ....................................... 370/352; 370/356
(58) Field of Search ................................. 370/338, 356, 370/401, 352–355; 401/419–423; 526/463, 328, 389; 379/130, 88.17, 88.24, 93.262, 207–212, 90.01, 222–225; 434/118

(56) References Cited

U.S. PATENT DOCUMENTS

| | | | | | |
|---|---|---|---|---|---|
| 5,864,607 A | * | 1/1999 | Rosen et al. | ............. | 379/90.01 |
| 5,991,292 A | * | 11/1999 | Focasaneanu et al. | ...... | 370/352 |
| 6,026,087 A | * | 2/2000 | Mirashrafi et al. | .......... | 370/389 |
| 6,125,126 A | * | 9/2000 | Hallenstal | .................... | 370/352 |
| 6,134,235 A | * | 10/2000 | Goldman et al. | ........... | 370/352 |
| 6,195,414 B1 | * | 2/2001 | Simmons et al. | ........... | 379/225 |
| 6,196,846 B1 | * | 3/2001 | Berger et al. | ................ | 434/118 |
| 6,347,085 B2 | * | 2/2002 | Kelly | .......................... | 370/352 |

OTHER PUBLICATIONS

AT&T; "AT&T Digital Long Distance Service ISDN"; 1998; 2 pages.
AT&T; "AT&T Digital Long Distance Service ISDN"; 1998; 4 pages.
AT&T; "AT&T begins Internet telephony trial in Boston area"; 1998; 2 pages.

* cited by examiner

Primary Examiner—Kwang Bin Yao
Assistant Examiner—Prenell Jones
(74) Attorney, Agent, or Firm—Cynthia T. Faatz

(57) ABSTRACT

A computer-implemented approach for concurrently enabling voice calls and having a computer system coupled to a packet switched network over a first communications line. The approach includes a step of detecting whether a computer system is coupled to a packet switched network via the first communications line and if the computer system is coupled to the packet switched network, a step of concurrently enabling voice communications over the first communications line using a first voice telephony device coupled to the computer system.

27 Claims, 6 Drawing Sheets

METHOD AND APPARATUS FOR SWITCHING VOICE CALLS USING A COMPUTER SYSTEM

FIELD OF THE INVENTION

The present invention relates to the field of network computing. More particularly, various embodiments relate to a method and apparatus for switching voice calls using a computer system.

BACKGROUND OF THE INVENTION

Personal computers are now used in many homes for a wide variety of purposes. Increasingly, home computer users are using the Internet for email, as an information resource, for shopping, etc. Some home computer users may be connected to the Internet (or another packet switched network) for several hours at a time.

Many homes, including those of home personal computer users, only have a single telephone line. Because a large percentage of home computer users gain access to the Internet or another packet switched network over a modem using their telephone line, Internet use may tie up the telephone line. Where this is the case, other people in the household cannot use the telephone to make calls, and outside people cannot call into the home during this time.

Some people have chosen to address this issue by having a cellular telephone to handle incoming and outgoing calls while the installed telephone line is being used for Internet or other remote server access. Cellular phones are also costly and result in multiple home telephone numbers.

Alternatively, the home computer user may subscribe to a call waiting service to handle incoming calls. This solution, however, addresses only half of the problem. Others in the household are still unable to make outgoing calls. Further, the incoming call allowed by the call waiting service may disrupt the home computer user's connection to the Internet.

Some people subscribe to a service that allows individual voice calls over the Internet while a computer is logged on to the Internet. An example of such a service is the WorldNet[SM] Service from AT&T. Such services, however, do not provide for a user to use a standard voice telephony device, such as a telephone handset, to conduct the telephone call. Using such services, only the computer system user or someone sitting at the computer system can conduct such telephone conversations. Further, such services do not provide for multiple calls to be switched and managed using the computer system. It may be desirable to switch and manage multiple telephone calls, for example, to achieve benefits similar to call waiting and conference calling services currently provided by local telephone companies.

Another approach is to install a second telephone line, an Integrated Services Digital Network (ISDN) line, an Asymmetric Digital Subscriber Line (ADSL), or a cable modem line that is used only by a personal computer to access the Internet. The addition of such lines, however, may be costly and, therefore, may not be a widely available alternative. Further, a requirement to add a second telephone or other type of line to enable concurrent telephone and Internet use increases the perceived total cost of computer ownership, and, may prevent some people from purchasing a computer.

Even where such a line is installed, however, there may still be a desire to route one or more telephone calls over the ISDN, ADSL, cable modem or second telephone line while accessing the Internet or another packet switched network. Currently available services and hardware do not provide this capability.

SUMMARY OF THE INVENTION

A method and apparatus for simultaneously connecting a computer system to a packet switched network and communicating via voice calls using a single communications line are described.

For one embodiment, a computer-implemented method for communicating over a first communications line includes steps of detecting whether a computer system is coupled to a packet switched network via the first communications line and, if the computer system is coupled to the packet switched network, concurrently enabling voice communications over the first communications line using a first voice telephony device coupled to the computer system.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A method and apparatus for using a single communications line to communicate via voice calls and connect a computer system to a packet switched network are described. In the description that follows, a connection between a computer system and the Internet is described for purposes of illustration. It will be appreciated, however, that other embodiments are applicable to other types of packet switched networks. Further, in the description that follows, for purposes of example, a computer system is connected to the Internet or other packet switched network over a conventional telephone line. It will be appreciated that other embodiments are applicable to other types of communications lines, such as a cable modem line or Digital Subscriber Line (DSL), for example, over which a computer system may be coupled to a packet switched network.

Figure 1:
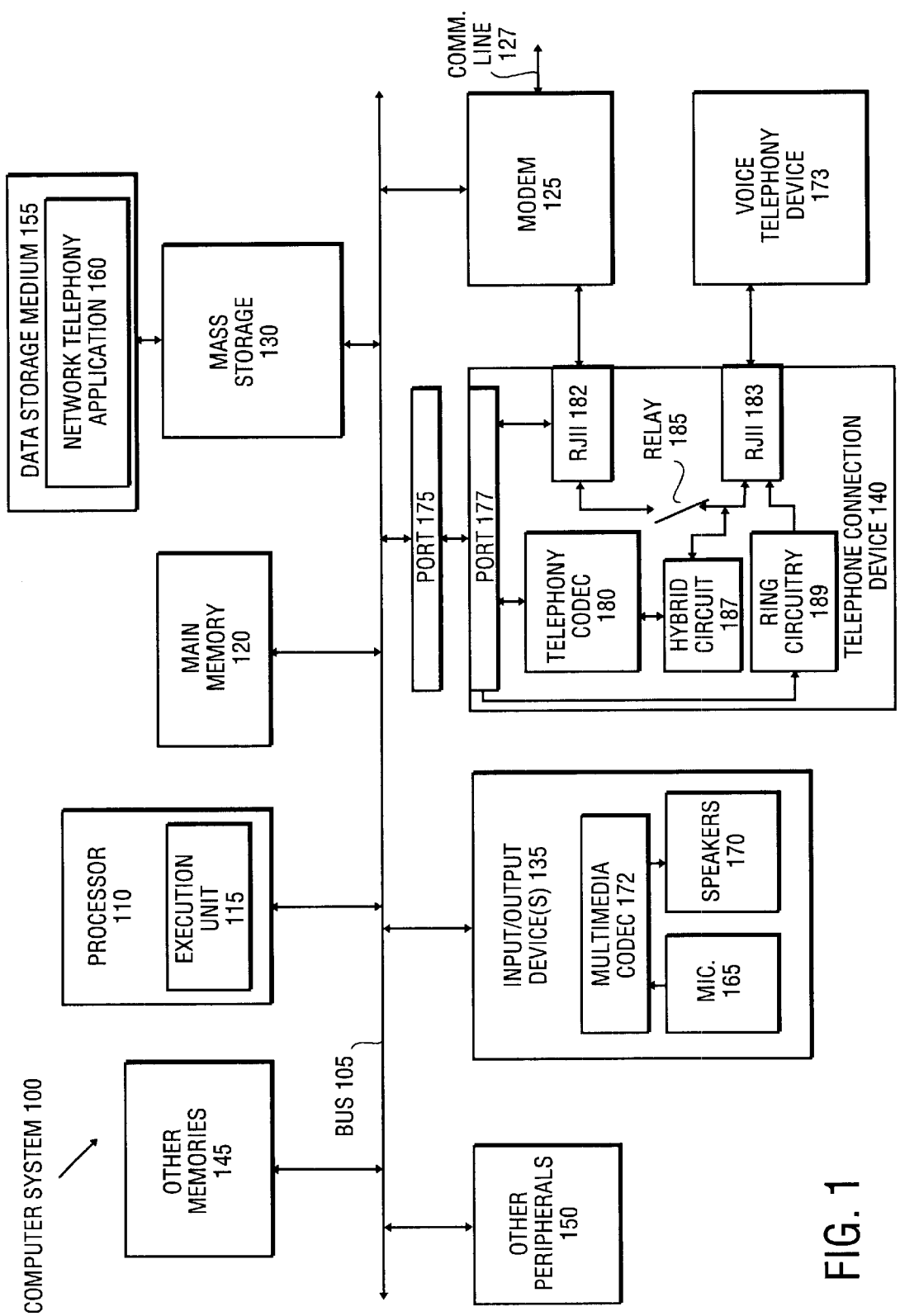
FIG. 1 is a block diagram showing a computer system that may be used for one embodiment.

FIG. 1 is a block diagram showing a computer system 100 that may be used for one embodiment. The computer system 100 includes a bus 105 for communicating information, a processor 110 including an execution unit 115 coupled to the bus 105 for processing information, and a main memory 120 coupled to the bus 105 for storing information and instructions for the processor.

A modem 125, or other network connection device that enables the computer system 100 to connect to a packet switched network via a communications line 127, such as a conventional telephone line, is coupled to the bus 105. Also coupled to the bus 105 for one embodiment are a mass storage device 130, one or more input and/or output device(s) 135, and one or more voice telephony device connection device(s) 140, referred to herein as telephone connection device(s) 140 for simplicity. A telephone line, as the term is used herein, corresponds to a single telephone number and connects to a telephone company voice switch in a central office. The computer system 100 may also include other memories 145 and other peripherals 150 also coupled to the bus 105.

The mass storage device 130 provides a means for storing information and instructions for use by the processor 110. A data storage medium 155 for storing digital information is configured to operate with the mass storage device 130. The data storage medium 155 is capable of storing sequences of instructions that cause the computer system 100 to perform specific functions. The processor 110 has access to the digital information on the data storage medium 155 via the bus 105.

The mass storage device 130 may be a conventional hard disk drive, floppy disk drive, compact disc read only memory (CD ROM) drive, or other magnetic or optical data storage device for reading and writing information from and to the data storage medium 155. The data storage medium 155 may be a hard disk, a floppy disk, a CD ROM, a magnetic tape, or other magnetic or optical data storage medium.

A network telephony application 160 of one embodiment may be stored on the data storage medium 155 and subsequently loaded into and executed within the computer system 100 using well-known techniques. The data storage medium 155 may also store an operating system and/or other software modules. It will be appreciated by those of skill in the art that, although the network telephony application 160 is shown as being stored on the data storage medium 155, the network telephony application 160 may be stored in any memory of the computer system 100 including the main memory 120.

The input and output devices 135 of one embodiment include a microphone 165, one or more speakers 170 and a multimedia codec 172. The multimedia codec 172 provides analog to digital and digital to analog capabilities for signals communicated between the bus 105 and the microphone 165 and speakers 170. Additionally, the input and output devices 135 may include a keyboard, cursor control device and monitor (not shown in FIG. 1). Other input and/or output devices may also be used for other embodiments.

The telephone connection device(s) 140 enables a voice telephony device 173, such as a local telephone, answering machine or cordless base station, to be coupled to the computer system 100. The telephone connection device(s) 140 of one embodiment is detachably coupled to the bus 105 through a port such as a communications (COM), Industry Standard Architecture (ISA), Peripheral Component Interconnect (PCI) or universal serial bus (USB) port 175, for example, on the computer system 100. For this embodiment, the telephone connection device 140 includes a corresponding port 177 through which the telephone connection device(s) 140 is connected to the computer system 100. For an alternative embodiment, the telephone connection device 140 may be integrated into the computer system 100 and provided in the same chassis as many of the other components shown in FIG. 1.

The telephone connection device 140 also includes telephony analog to digital and digital to analog (codec) logic 180, two conventional telephone jacks 182 and 183 (RJ11 jacks for one embodiment) or other communications line connectors, and a failsafe or other type of relay or switch 185.

Additionally, the telephone connection device 140 of one embodiment includes a hybrid circuit 187 and ring circuitry 189. The hybrid circuit 187 converts two wire signals from the voice telephony device 173 to four wire signals that can be used by the computer system 100 and vice versa. The ring circuitry 189 causes the voice telephony device 173 to ring, or make another appropriate sound, in response to an incoming call.

For one embodiment, the ring circuitry 189 is controlled by the network telephony application 160.

The telephony codec 180 is coupled to the port 177 and to the R11 jack 183 through the hybrid circuit 187. The modem 125 is detachably coupled to the second RJ11 jack 182. The RJ11 jack 182 is also coupled to the RJ11 jack 183 and the telephony codec 180 through the relay 185 when the relay 185 is in a closed position. The voice telephony device 173 is detachably coupled to the telephone connection device 140 at the RJ11 jack 183.

The operation of the telephone connection device 140 is described in more detail below.

Other embodiments are applicable to other types of computer systems or computer systems that are configured in a different manner than the computer system 100.

Figure 2:
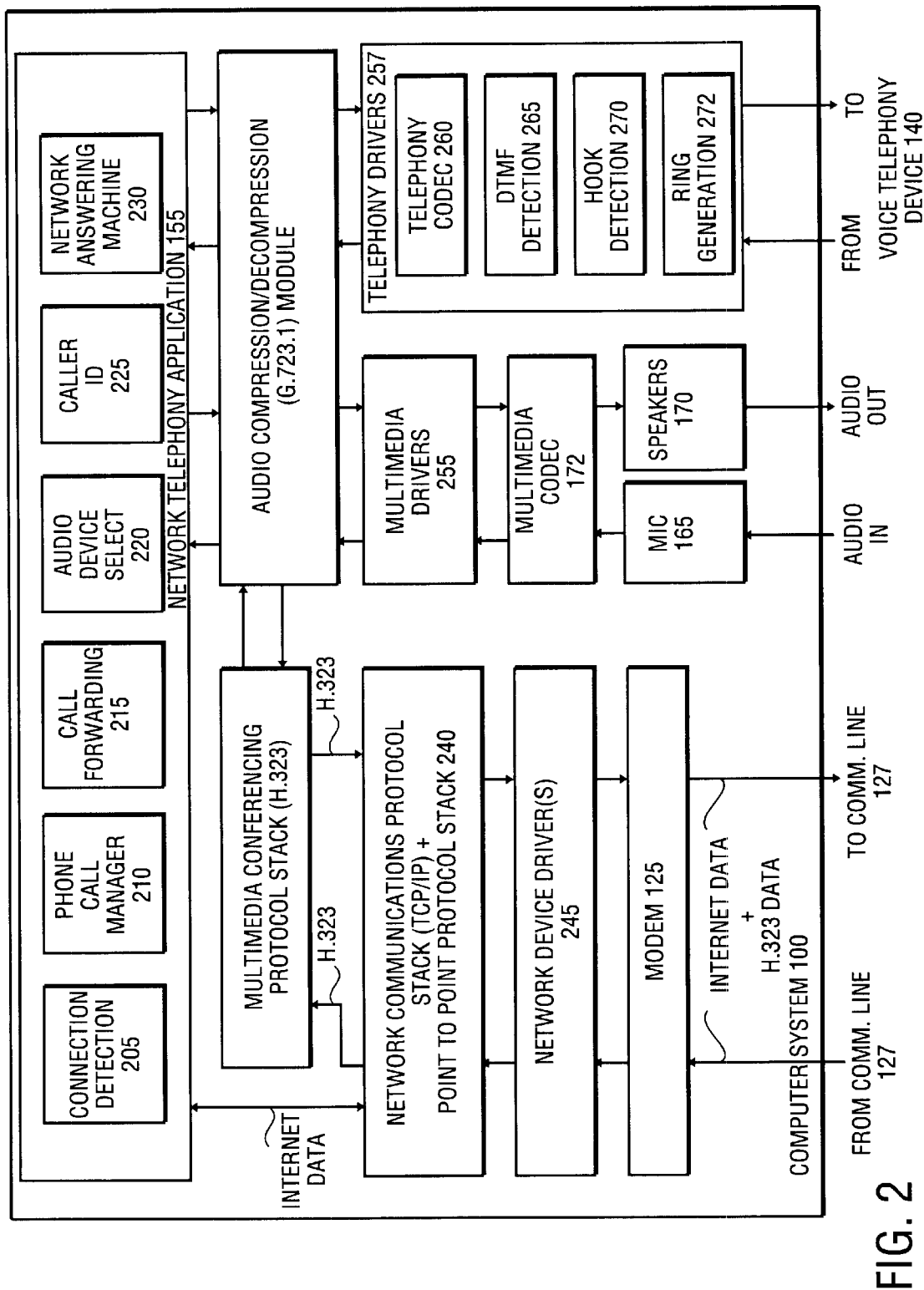
FIG. 2 is a block diagram showing the hardware and software modules of the computer system of FIG. 1 in more detail.

FIG. 2 is a block diagram showing some hardware and software modules (also referred to as code segments) of the computer system 100 of one embodiment in more detail. As shown in FIG. 2, the network telephony application 155 includes a connection detection module 205 to detect when the computer system 100 is connected to the Internet or other packet switched network, a telephone call manager module 210 to originate and answer multiple telephone calls via the Internet or other network, a call forwarding module 215 to enable a computer system 100 user to have telephone calls forwarded to another number while he or she is connected to the Internet, and an audio device select module 220 to enable the local telephone 173 handset to be used as an audio device for voice calls.

The network telephony application 155 may also include a caller identification (ID) module 225 to provide a telephone number or other information to identify a remote caller and a network answering machine module 230 to answer remote calls and store messages if the user is not available. For alternative embodiments, the network telephony application may include additional software modules or may not include all of the software modules shown in FIG. 2.

In addition to the network telephony application 155, the computer system 100 includes a multimedia conferencing protocol stack 235, a network communications protocol stack 240, network device driver(s) 245 for the modem or other network communications device 125, audio compression/decompression (codec) module 250, multimedia drivers 255, telephony drivers 257 and the multimedia codec 172 as shown in FIG. 2.

For one embodiment, the multimedia conferencing protocol stack 235 is an H.323 protocol stack. H.323 is a protocol for Multimedia Conferencing for Packet Switched Networks promulgated by the International Telecommunication Union—Telecommunication Standardization Sector (ITU-T). For other embodiments, an H.323 follow-on protocol or another type of conferencing protocol may also be used.

Also for one embodiment, the network communications protocol stack 240 includes a Transmission Control Protocol/Internet Protocol (TCP/IP) stack. TCP/EP is a protocol that is widely used for Internet and other network communications. Additionally, the network communications protocol stack 240 may include a point-to-point protocol (PPP) stack to be used in interfacing with an Internet service provider (ISP), for example. For alternative embodiments, other types of network communications protocols may also be used.

The audio codec 250 of one embodiment, is a G.723.1 dual rate speech codec. G.723.1 is a speech codec recommended for use with the H.323 protocol by the ITU Study Group 15. For other embodiments, the audio codec 250 may be a G.729a codec, a G.711 codec or another type of codec.

The G.723.1 codec receives a compressed digital audio signal via communications line 127 and outputs a corresponding uncompressed audio signal to one or both of the multimedia codec 172 or/and the telephony codec 180 (FIG. 1) through multimedia drivers 255 or/and telephony drivers 257.

The G.723.1 codec also receives an uncompressed digital audio signal from one or both of the multimedia codec 172 or/and the telephony codec 180 (FIG. 1) and provides a corresponding compressed audio signal to the H.323 stack 235 to be communicated over a network via communications line 127. A digital signal processor, a follow-on of the G.723.1 codec or another type of audio codec may be used in place of the G.723.1 codec for alternative embodiments.

The telephony drivers 257 include a telephony codec driver 260 to send and receive samples from the telephone connection device 140, a dual tone multiple frequency (DTMF) detection driver 265 to enable touch tones from the local telephone 173 to be detected and interpreted by the computer system 100, a phone hookswitch change detection driver 270 to enable the computer system 100 to detect when the voice telephony device 173 handset is "off the hook" or in an other than idle state, and a ring generation driver 272 to drive the ring circuitry 189 to generate a ring or other notifying signal at the telephony device 173 when an incoming call is received. Additional drivers may be provided for other embodiments and not all of the above drivers may be provided for all embodiments.

The multimedia codec 172 is provided to receive an analog audio signal from the microphone 165 and provide a corresponding digital signal to the G.723.1 module 250 through the multimedia drivers 255. The multimedia codec 172 is also provided to receive a digital audio signal from the G.723.1 module 250 and provide a corresponding analog audio signal to the speakers 170. In this manner, the multimedia codec 172 enables audio communication between the computer system 100 and its user through the microphone 165 and the speakers 170. For one embodiment, the multimedia codec 172 is provided on a sound card that is added to or integrated within the computer system 100.

The telephony codec 180 of FIG. 1 operates in a similar manner to the multimedia codec 172 except that the telephony codec 180 samples an analog input signal received from the voice telephony device 173 through the corresponding RJ11 jack 183 (or other connection device) and provides a corresponding digital output signal to the G.723.1 module 250 through the drivers 255. A digital signal received by the telephony codec 180 (FIG. 1) from the G.723.1 module 250 through the drivers 257 is converted by the telephony codec 180 to a corresponding analog signal. The corresponding analog signal is provided to the voice telephony device 173 through the RJ11 jack 183.

The H.323 stack 235, the TCP/IP stack 240, the G.723.1 codec 250, and/or the drivers 245, 255 and 257 may be provided as part of an operating system (not shown), an application program, or as modules that are individually or collectively loaded and stored in a memory of the computer system 100.

Figure 3:
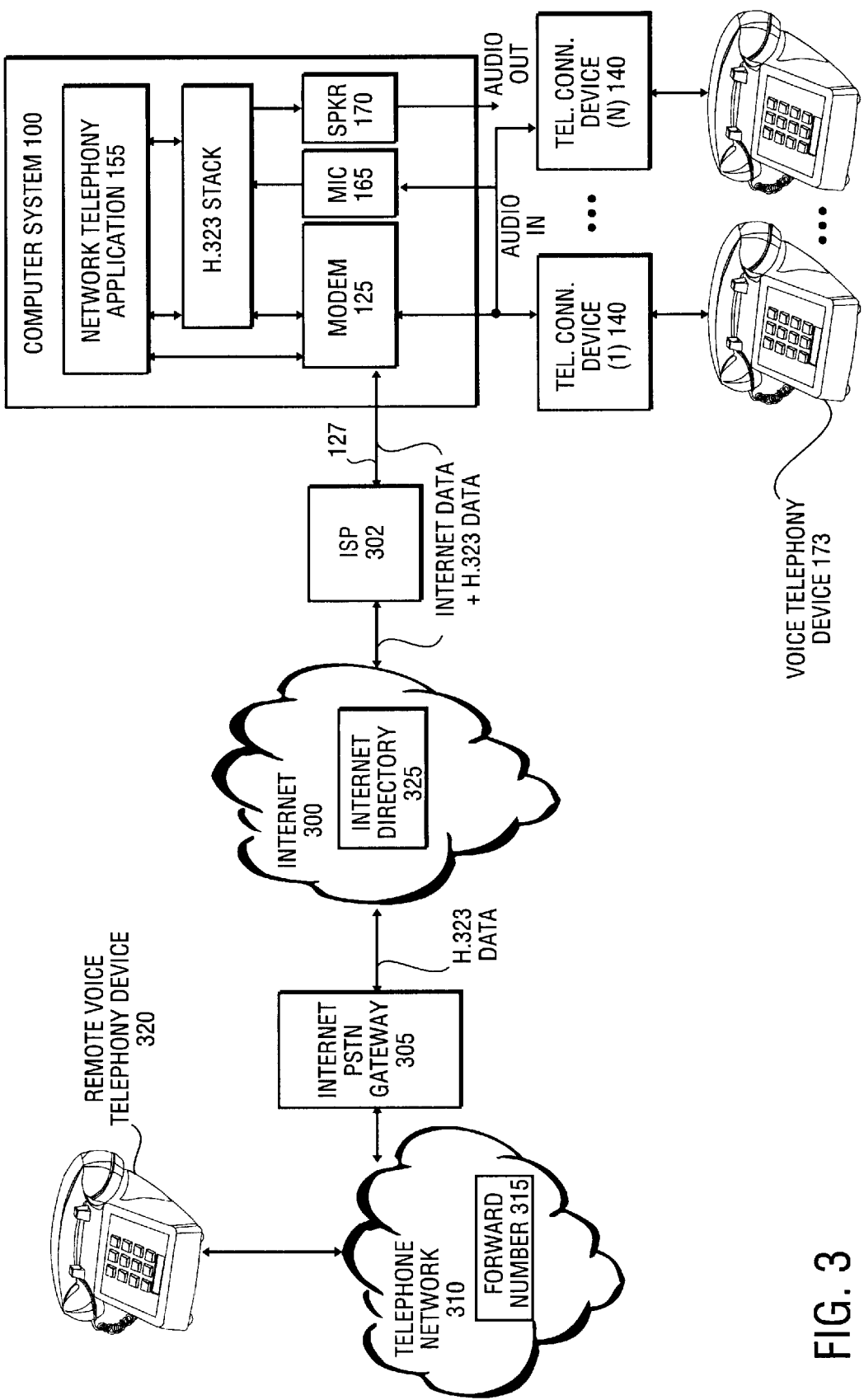
FIG. 3 is a block diagram showing the computer system of FIGS. 1 and 2 coupled to a local telephone and to the Internet.

FIG. 3 is a block diagram showing the computer system 100 of FIGS. 1 and 2 connected to the Internet 300 or another packet switched network. The computer system 100 is connected to the Internet 300 by the modem 125 over the communications line 127. The computer system 100 may be connected to the Internet 300 through an ISP 302. In this case, once the ISP 302 is contacted by the computer system 100, the ISP establishes the connection between the computer system 100 and servers on the packet switched network 300.

While the computer system 100 is connected to the Internet 300, Internet data is transmitted between the Internet 300 and the computer system 100 over the communications line 127. Other approaches to connecting the computer system 100 to a packet switched network are applicable to alternative embodiments.

An Internet-to-Public Switched Telephone Network (Internet-to-PSTN) gateway 305 is coupled to the Internet 300. The Internet-to-PSTN gateway 305 may be operated by the ISP 302, by a telephone company, or by another entity. Commercially available Internet-to-PSTN gateways are available from several suppliers. For example, the Internet-to-PSTN gateway of one embodiment may be an L2W-323 gateway from RADVision, Inc. of Mahwah, N.J. or RADVision, Ltd. of Tel-Aviv, Israel. Other suppliers of similar gateways include companies such as Cisco Systems, Inc. of San Jose, Calif. and Lucent Technologies of Murray Hill, N.J., for example. Other types of gateways that provide communications capabilities between a packet switched network and a telephone network may also be used for alternative embodiments.

The Internet-to-PSTN gateway 305 is also coupled to a public switched telephone network 310. The telephone network 310 provides access to all public switched telephones for one embodiment.

The operation of various hardware and software components and modules of the computer system 100 is now described in more detail with reference to FIGS. 1–4.

Referring first to FIG. 1, when the voice telephony device 173 is connected to the telephone connection device 140, the relay 185 is closed such that the RJ11 jack 183 is connected to the telephone line 127 through the RJ11 jack 182 and the modem 125. In this manner, the voice telephony device 173 is connected to the telephone line 127 and can be used as a conventional telephone when the computer system 100 is not in use and/or when the computer system 100 is not connected to the Internet 300. The relay 185 is in the open position when the voice telephony device 173 is not in use such that Internet data communicated over the communications line 127 is provided directly to the computer system 100 over the bus 105. For one embodiment, the relay 185 defaults to an open position and its operation is controlled by the hook switch change detection driver 270 of FIG. 2. In this manner, the relay 185 can be closed when an incoming call is answered or when an outgoing call is placed.

With specific reference to FIGS. 1–3, the computer system 100 is connected to the Internet 300 or other packet switched network over the telephone line 127 using the modem 125. When the computer system 100 is connected to the Internet 300 (or while the computer system 100 is connecting to the Internet 300), the connection detection module 205 detects the connection such that telephone calls to and from the telephone line 127 can be managed by the network telephony application 155 as described in more detail below.

Also, while the computer system 100 is connecting to the Internet 300 (for example, while an Internet access number is being dialed), for one embodiment, a user may invoke the call forwarding module 215 to forward telephone calls to the communications line 127 to another telephone line. For one embodiment, a user subscribes to a call forwarding service provided by a local telephone company to enable this forwarding feature. The forwarding service provided by local telephone companies is relatively inexpensive and does not require the addition of a second telephone line in order for calls to be forwarded.

Calls can be forwarded using such a forwarding service by entering a specific command at one of the computer system 100 input/output devices 135. The command is then acted upon by the call forwarding module 215. The computer system 100 user supplies a number 315 to which calls are to be forwarded such that all calls to the communications line 127 are forwarded to the number 315. For this example, the number 315 to which calls are forwarded is a number corresponding to the Internet-to-PSTN gateway 305.

For an alternative embodiment, calls may be forwarded using the call forwarding module 215 prior to connecting the computer system 100 to the Internet 300 or other packet switched network. Also, for alternative embodiments, a call forwarding service may be provided by an entity other than the local telephone company or call forwarding may be accomplished in a different manner.

Once calls have been forwarded, an incoming call from a remote telephone 320 to the telephone number corresponding to the communications line 127 is received by the telephone network 310. The telephone network 310 determines that calls to the telephone line 127 have been forwarded to the number 315 that corresponds to the gateway 305.

The call from the remote telephone 320 is then forwarded to the Internet-to-PSTN gateway 305. The gateway 305 checks an Internet directory 325 to determine whether the computer system 100 corresponding to the telephone number of the communications line 127 is connected to the Internet 300. For one embodiment, the Internet directory 325 stores a telephone number and a corresponding user's email name, Internet Protocol (IP) address or other static identifier that uniquely identifies a particular user, ISP account or computer system, for example. Once the user or computer system is connected to the Internet 300, the Internet directory 325 is updated to indicate the connection.

If the Internet directory 325 indicates that the communications line 127 is connected to the Internet 300, the Internet-to-PSTN gateway 305 creates an H.323 connection to the computer system 100 over the Internet 300 and the communications line 127. In this manner, the incoming call from the remote telephone 320 is connected to the computer system 100. When the incoming call is received by the computer system 100, the phone call manager 210 causes the ring circuitry 189 to "ring" the voice telephony device 173 such that a user is made aware of the incoming call.

In answering the incoming call, a user of the computer system 100 has the option of conducting the call using the microphone 165 and speaker(s) 170 or the local telephone 173 as audio communications device(s). For one embodiment, in response to user input, the audio device select module 220 selects whether to send and receive audio signals to and from either the COM/USB port 175 or the port(s) (not shown) to which the microphone 165 and speakers 170 are coupled. The audio device select module 220 can be used once to select the audio communications device(s) for all calls over the telephone line 127 while the computer system 100 is connected to the Internet 300. Alternatively, the audio device select module 220 can be used to select the desired audio communications device(s) on a call by call basis.

For some embodiments, multiple telephone connection devices 140(1)–(N) are provided, where N may be any number. For such embodiments, each of the multiple telephone connection devices 140(1)–(N) is coupled to a separate voice telephony device in the manner described above. Where multiple telephone connection devices 140 are used, the audio device select module 220 may be used, on a per call basis or based on a particular priority scheme, for example, to identify the particular telephone connection device 140(1)–(N) to which a call is to be directed. The telephone connection devices 140(1)–(N) may be identified by extension numbers, for example, with each extension number corresponding to one of the telephone connection devices 140(1)–(N). In this manner, multiple voice calls may be conducted simultaneously and separately. The multiple telephone connection devices 140(1)–(N) may each be used for both incoming and outgoing calls.

Once the audio communications device(s) have been selected, an incoming call is answered by a computer system 100 user through the phone call manager module 210. The phone call manager module 210 enables the computer system 100 to manage multiple incoming and outgoing voice calls over the telephone line 127 while the computer system 100 is connected to the Internet 300 over the telephone line 127. The multiple calls may be presented to separate voice telephony devices as described above. Alternatively, multiple calls may all be forwarded to a single voice telephony device and a call waiting signal driven by the phone call manager module 210, for example, may be used to indicate a second incoming call while a first call is in progress.

Also, the phone call manager module 210 enables the computer system 100 to add an incoming H.323 call to an H.323 call already in progress. For one embodiment, the phone call manager module 210 accomplishes this by mixing audio from the computer system 100 microphone 165 and speaker(s) 170 with audio from the local telephone 173.

Thus, multiple calls may be managed simultaneously even where a single telephone connection device 140 is used.

With continuing reference to FIGS. 1–3, the H.323 data transmitted to the computer system 100 over the telephone line 127 is received by the modem 125. The H.323 data is then communicated through the network driver 245, the communications protocol stack 245 and the H.323 stack. The H.323 stack passes the compressed audio embedded in the H.323 data to G.723 module 250 which decompresses the audio. G.723 passes the decompressed audio samples to the telephony codec driver 257, which, in turn, plays them to the handset via the telephony codec 260.

The person using the local telephone 173 speaks into the local telephone 173 handset to respond to the demote caller. His or her voice is transmitted through the RJ11 jack 183 to the telephony codec 180 in the form of an analog signal. The telephony codec 180 samples the analog signal to provide a corresponding digital signal. The audio codec driver 260 receives the digital signal and provides it to the G.723.1 module 250. The G.723.1 module 250 compresses the digital signal and provides a compressed digital signal to the H.323 stack 235. Corresponding H.323 network packets are then communicated through the TCP/IP stack 240, the network device drivers(s) 245 and the modem 125 to the communications line 127.

The H.323 signal is communicated via the Internet 300 to the Internet-to-PSTN gateway 305 and to the remote telephone 320 via the telephone network 310. In this manner, the computer system 100 enables simultaneous telephone voice communication and connection to the Internet 300 over the single telephone or other communications line 127.

If the microphone 165 and speaker(s) 170 are instead selected as the audio communications devices, the H.323 data from the telephone line 127 is communicated through the modem 125, the network device driver(s) 245, and the TCP/IP stack 240 to the H.323 stack 235. The H.323 data is then communicated to the G.723.1 codec 250 where the H.323 data is uncompressed. The uncompressed digital H.323 data is communicated to the multimedia codec 172 through the multimedia drivers 255. The multimedia codec 172 converts the digital H.323 data into corresponding analog data that is provided to the speaker(s) 170.

Audio received by the microphone 165 is provided as an analog audio signal at an output of the microphone 165. The analog signal is digitized by the multimedia codec 172, compressed by the G.723.1 codec 250 and provided as H.323 data over the telephone line 127 to the Internet 300. The Internet-to-PSTN gateway 305 provides the corresponding data over the telephone network 310 to the remote telephone 320.

Additional telephone calls from other remote telephones are managed in a similar manner and may be received by the computer system 100 while other calls are in progress for one embodiment. As described, calls received while another call is in progress may be managed through a call waiting signal or may be forwarded to additional voice telephony device(s) and/or the speakers 170 and microphone 165 as available.

It is now assumed for purposes of illustration, that a call is to be made from the local voice telephony device 173 while the computer system 100 is connected to the Internet 300 over the telephone line 127. For one embodiment, such a call may be placed while another voice call is in progress using the speakers 170 and microphone 165 or another voice telephony device, for example. If multiple call appearances (using call waiting) are managed via a single telephony device, then, at any instant, only one stream is active from the telephony device. The call manager coordinates with the PSTN gateway to send the audio packets to the correct remote telephone endpoint. The phone hook switch detection driver 270 detects when the voice telephony device 173 handset is removed from the hook or the device 173 is otherwise enabled. As a telephone number to be called is entered at the voice telephony device 173, the DTMF detection driver 265 detects the touch tones and converts them into the corresponding numbers which are provided by the phone call manager 210 over the Internet 300.

The telephone number is checked against the Internet directory 325 to determine whether the person being called is connected to the Internet, 300 in the manner described above. If the person being called is connected to the Internet 300, the computer system 100 makes an H.323 connection to his or her computer system.

Alternatively, if the person being called is not connected to the Internet 300, the phone call manager 210 routes the call to the Internet-to-PSTN gateway 305 by making an H.323 connection to the gateway 305. The gateway 305 then makes the desired connection to the telephone or other communications line being called through the telephone network 310.

Once the connection is established between the computer system 100 and the telephone line being called, voice data is communicated between the telephone line being called and the voice telephony device 173 or microphone 165 and speaker(s) 170 in the same manner as described above with reference to an incoming call.

Referring to FIG. 2, while voice calls are in process, as described above, and/or while the computer system 100 is being used for Internet 300 access, within the computer system 100, Internet data is communicated to the network telephony application 155 and to other applications and software (not shown) over the communications line 127 through the modem 125, the network device driver(s) 245, and the TCP/IP stack 240. Internet data from the computer system 100 to the Internet 300 is communicated from the network telephony application 155 and/or other software through the various software and hardware layers to the Internet 300 in the reverse order to that described above.

Figure 4:
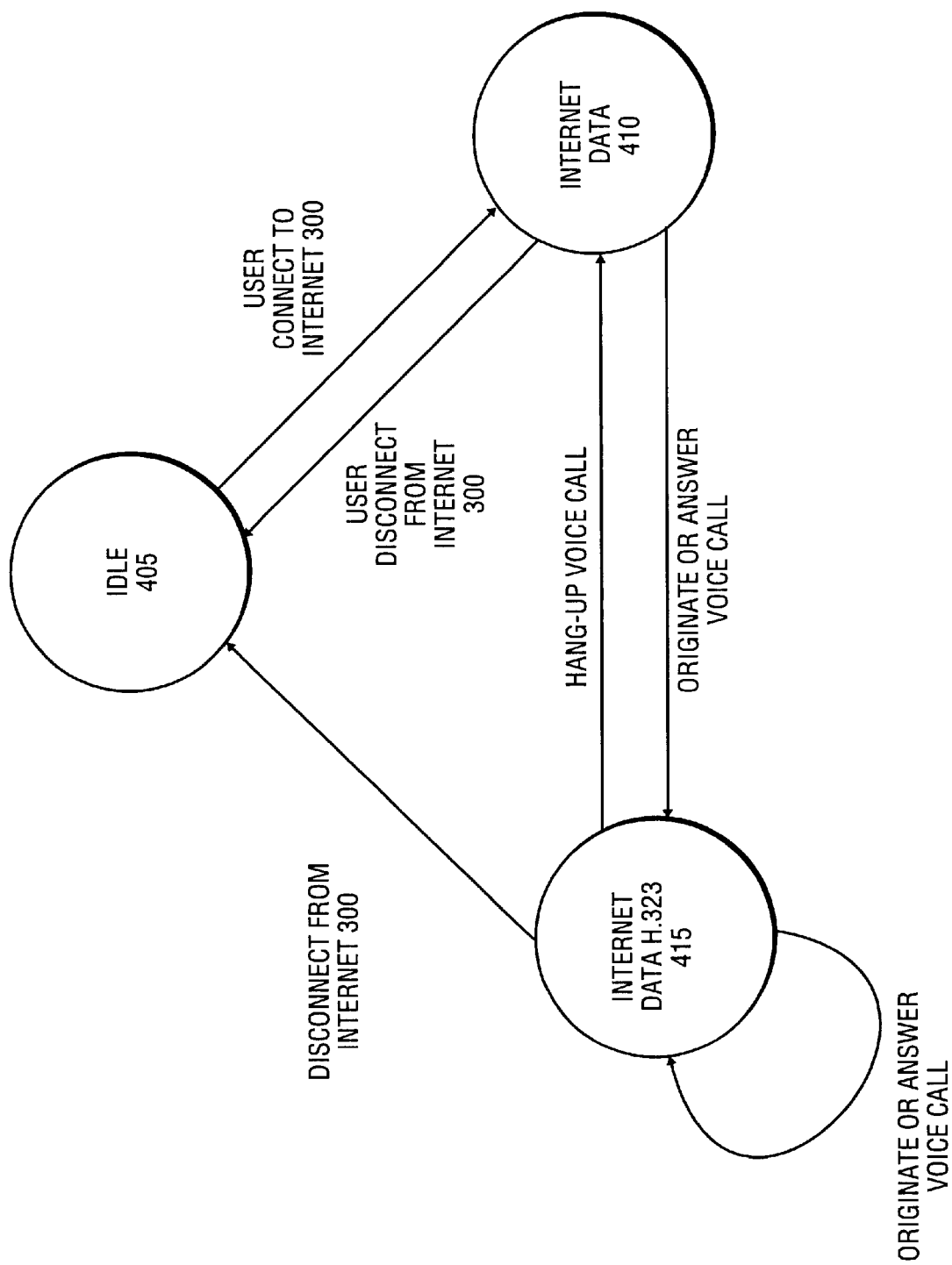
FIG. 4 is a state diagram showing the states of the telephone line of FIGS. 1, 2 and 3 for one embodiment.

The state diagram 400 of FIG. 4 describes the various states of the telephone or other communications line 127 depending on the activities taking place. Assuming first that the telephone line 127 is connected to the computer system 100, but is not in use, the telephone line 127 starts in the idle state 405. When a computer system 100 user connects to the Internet 300 or another remote network over the telephone line 127, the telephone line 127 moves to a state 410 in which Internet data is communicated over the telephone line 127.

Originating or answering a voice telephone call causes the telephone line 127 to move to a state 415 in which both Internet data and H.323 (or other multimedia or audio data) is communicated over the telephone line 127. The telephone line 127 remains in the state 415 if other voice calls are originated or answered. If all voice calls are discontinued, i.e. the user "hangs up," the telephone line 127 returns to the state 410. If the user disconnects from the Internet 300 from either the state 410 or the state 415, the telephone line 127 returns to the idle state 405.

Referring back to FIG. 2, the network telephony application 155 of one embodiment also includes a caller ID module 225 such that the source of an incoming call can be identified. In this manner, a computer system 100 user can determine whether he or she would like to answer the incoming call.

A network answering machine module 230 is also included for some embodiments. The network answering machine module enables the storage of voice messages if an incoming call is not answered at the time it is received. The message may be stored in compressed or uncompressed form and can be played back using either the speaker(s) 170 or the telephone 173 handset as an audio output device. The message may be stored while another call is in process, for example.

In accordance with the embodiments described above, a single telephone line may be used to simultaneously communicate via a conventional voice telephony device and connect to the Internet or another packet switched network. In this manner, a computer system user does not need to have a second telephone line installed or have a separate cellular telephone in order to make and receive telephone calls while on the Internet. Other household members, for example, can still use the telephone while one person is connected to the Internet, even where the household only includes a single telephone line.

Further, for some embodiments, the computer system can be used as a switching device such that a voice call can be added to a data connection and/or multiple calls can be managed simultaneously with one or more voice telephony devices.

Figure 5:
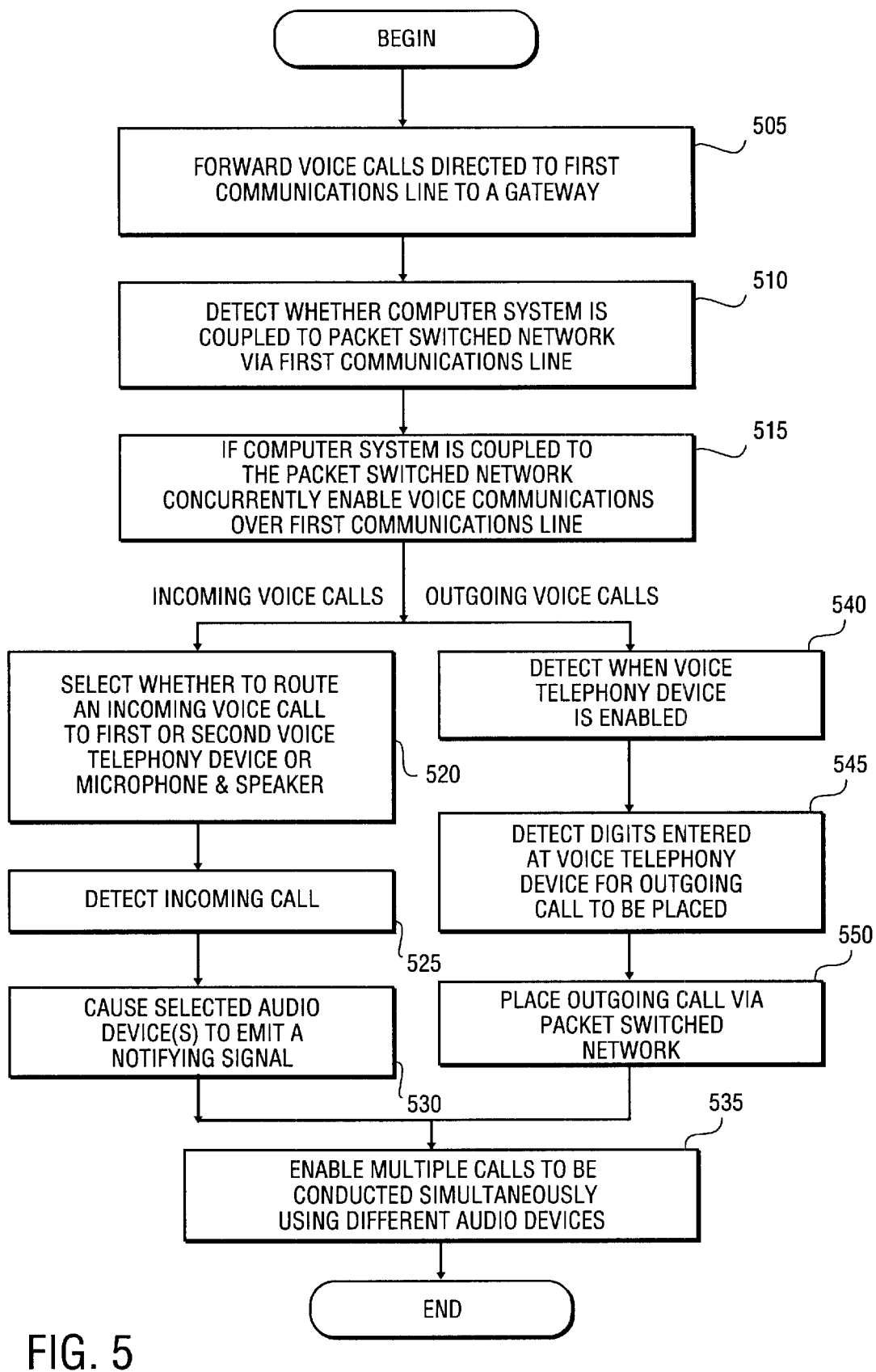
FIG. 5 is a flow diagram showing the method of one embodiment for concurrently coupling a computer system to a network and conducting voice calls with a voice telephony device using a single communications line.

FIG. 5 is a flow diagram showing the method of one embodiment for concurrently coupling a computer system to a network and conducting voice calls with a voice telephony device using a single communications line. For one embodiment, the steps described below are implemented by a computer system using software stored in a memory of the computer system or on a data storage medium. The steps may be performed in an order other than the order shown in FIG. 5.

The method includes steps 505 of forwarding voice calls directed to a first communications line to a gateway and 510 of detecting whether a computer system is coupled to a packet switched network over the first communications line. In step 515, if the computer system is coupled to the packet switched network, voice calls over the first communications line using a first voice telephony device are concurrently enabled.

For incoming voice calls, the method of one embodiment includes a step 520 of selecting whether to route an incoming voice call to the first or a second voice telephony device, or for one embodiment, a microphone and a speaker. Then, when an incoming call is detected in step 525, the selected audio device(s) are caused to emit a notifying signal in step 530. Multiple calls are enabled to be conducted simultaneously using different audio devices in step 535.

For outgoing voice calls, the method of one embodiment includes a step 540 of detecting when the first voice telephony device is enabled. In step 545, the digits entered at the first voice telephony device identifying an outgoing call to be placed are detected. In step 550, the corresponding outgoing call is placed via the packet switched network over the first communications line.

Figure 6:
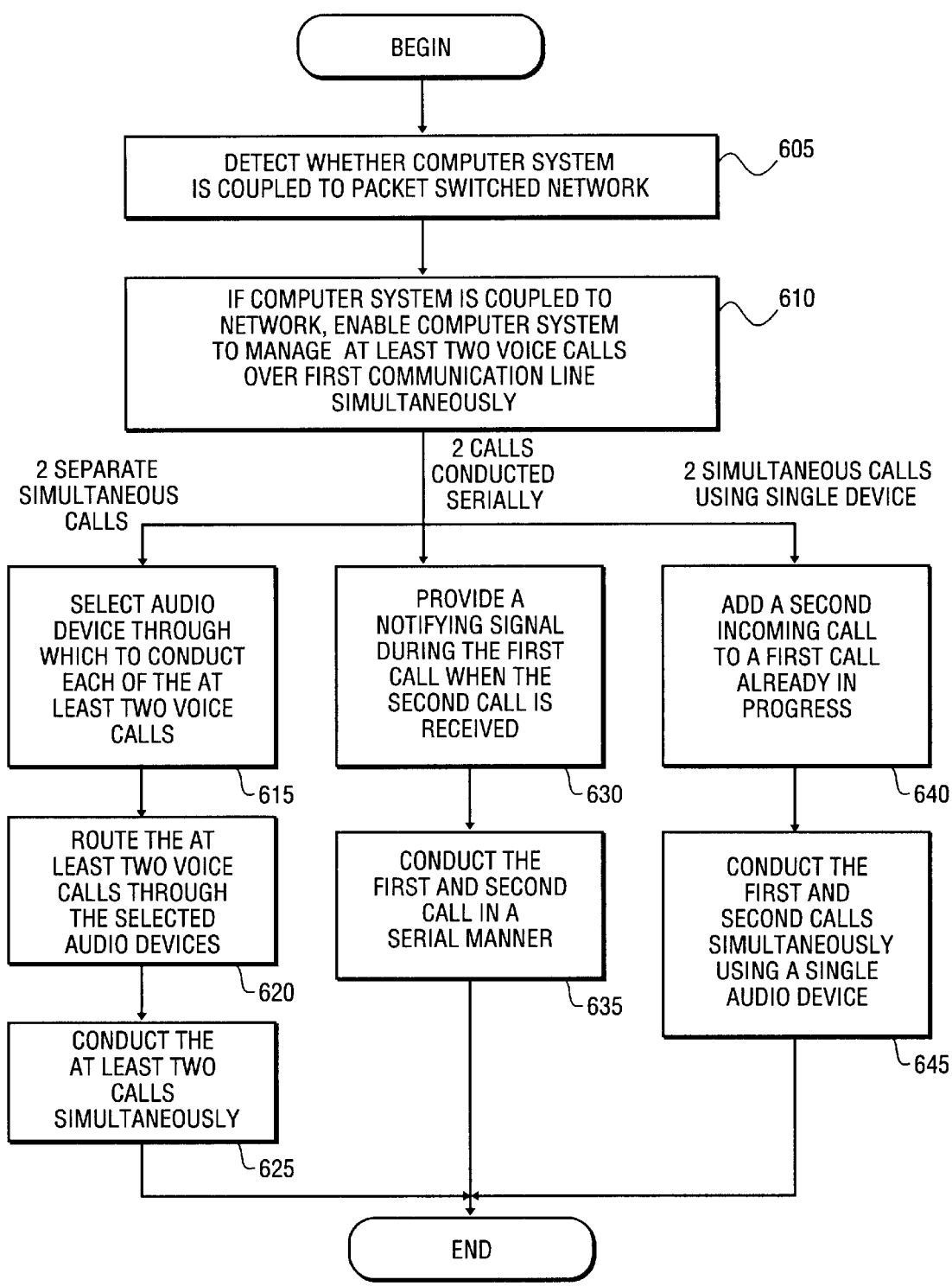
FIG. 6 is a flow diagram showing the method of an alternative embodiment for concurrently coupling a computer system to a network and managing multiple voice calls using a single communications line.

FIG. 6 is a flow diagram showing the method of an alternative embodiment for concurrently coupling a computer system to a network and managing multiple voice calls using a single communications line.

The method includes a step 605 of detecting when a computer system is coupled to a packet switched network over a first communications line and if the computer system is coupled to the network, a step 610 of enabling the computer system to manage at least two voice calls over the first communications line while the computer system is coupled to the packet switched network over the first communications line.

If two separate calls are to be handled simultaneously, the method of one embodiment includes a step 615 of selecting audio devices through which to conduct each of the at least two voice calls, a step 620 of routing the voice calls through the selected audio devices and a step 625 of conducting the at least two calls simultaneously.

If two separate calls are to be conducted serially, the method of one embodiment includes a step 630 of providing a notifying signal during a first call when a second call is received, and a step 635 of conducting the first and second calls separately, in a serial manner.

If two calls are to be conducted simultaneously using a single audio device, the method of one embodiment includes a step 640 of adding a second incoming call to a first call in process and a step 645 of conducting the first and second calls simultaneously using a single audio device.

It will be appreciated that the methods shown in FIGS. 5 and 6 may include additional steps or steps different than those shown for other embodiments.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-implemented method for communicating over a first communications line, the method comprising:

detecting whether a computer system is coupled to a packet switched network via the first communications line using a connection detection code segment;

if the computer system is coupled to the packet switched network, concurrently enabling voice communications over the first communications line using a first voice telephony device coupled to the computer system; and routing voice calls to and from the first communications line through the first voice telephony device while the computer system is coupled to the packet switched network over the first communications line.

2. The computer-implemented method of claim 1 further including:

forwarding voice calls directed to the first communications line to a gateway, the gateway being capable of forwarding the voice calls directed to the first communications line to the computer system over the first communications line.

3. The computer-implemented method of claim 1 wherein enabling includes:

detecting an incoming voice call; and causing the first voice telephony device to emit a notifying signal in response to the incoming voice call.

4. The computer-implemented method of claim 1 wherein enabling includes:

detecting when the first voice telephony device is enabled;

detecting digits entered via the first voice telephony device, the digits indicating an outgoing call to be placed; and placing the outgoing call via the packet switched network.

5. The computer-implemented method of claim 1 further including:

selecting whether to route an incoming voice call to the first voice telephony device or a second voice telephony device coupled to the computer system.

6. The computer-implemented method of claim 5 wherein enabling includes:

enabling a first voice call using the first voice telephony device to be conducted simultaneously with a second voice call using the second voice telephony device.

7. A computer-implemented method for communicating over a first communications line, the method comprising:

detecting whether a computer system is coupled to a packet switched network over the first communications line using a connection detection code segment; and if the computer system is coupled to a packet switched network, enabling the computer system to manage at least two voice calls simultaneously while the computer system is coupled to the packet switched network, the at least two voice calls being communicated over the first communications line.

8. The computer-implemented method of claim 7 further including:
- selecting an audio device through which to conduct each of the at least two voice calls;
- routing the at least two voice calls through the selected audio devices; and
- conducting the at least two voice calls simultaneously.

9. The computer-implemented method of claim 7 wherein the at least two voice calls include a first call and a second call, the method further including:
- providing a notifying signal during the first call when the second call is received.

10. The computer-implemented method of claim 7 wherein the at least two voice calls include a first call and a second call, the method further including:
- adding the second call to the first call while the first call is in process.

11. An apparatus for enabling voice communications using a computer system, the apparatus comprising:
- a telephony codec to convert analog signals received by the telephony codec to digital signals, the telephony codec further to convert digital signals received by the codec to analog signals;
- a first connector coupled to the telephony codec and to be coupled to a voice telephony device;
- a second connector to be coupled to a first communications line, the first and second connectors further to couple the first communications line to the telephony codec when the computer system is coupled to a packet switched network and the voice telephony device is enabled, such that the voice telephony device may be used for voice calls over the first communications line while the computer system is coupled to a packet switched network over the first communications line, the voice calls to be managed by a network telephony code segment in response to a connection detection code segment detecting that the computer system is coupled to the packet switched network.

12. The apparatus of claim 11 further including a hybrid circuit coupled to the telephony codec and the first connector, the hybrid circuit to convert a first type of signal received from the voice telephony device to a second type of signal that may be used by the computer system, the hybrid circuit further to convert the second type of signal received by the hybrid circuit to the first type of signal that may be used by the voice telephony device.

13. The apparatus of claim 11 further including ring circuitry coupled to the first connector, the ring circuitry to cause the voice telephony device to emit a notifying signal when an incoming voice call is received over the first communications line.

14. The apparatus of claim 11 further including a switch coupled between the first and second connectors, one terminal of the switch further being coupled to the telephony codec, the switch having a first state and a second state, the second connector being coupled to the first connector and the telephony codec when the switch is in the first state, the second connector being isolated from the telephony codec and the first connector when the switch is in a the second state.

15. The apparatus of claim 11 wherein, when the computer system is not communicating over the first communications line, the voice telephony device is coupled to the first communications line when the voice telephony device is enabled such that the voice telephony device may be used to place and receive voice calls over the first communications line.

16. The apparatus of claim 11 wherein the voice telephony device is a telephone, the first and second connectors are RJ11 jacks, and the communications line is a telephone line.

17. The apparatus of claim 11 wherein the communications line is one of a cable modem, an integrated services digital network (ISDN) line, or an Asymmetric Digital Subscriber Line (ADSL).

18. A personal computer system comprising:
- a bus to communicate information;
- a memory coupled to the bus to store information;
- a processor coupled to the bus and the memory to execute instructions; and
- a first voice telephony connection device coupled to the bus and to be coupled to a first voice telephony device and a first communications line, the first voice telephony connection device to enable voice calls via the first voice telephony device over the first communications line while the personal computer system is coupled to a packet switched network over the first communications line, wherein
  the memory is to store a program for execution by the processor, the program comprising
    a connection detection code segment to detect when the personal computer system is coupled to the packet switched network over the first communications line, and
    a phone call manager code segment to route voice calls to and from the first communications line through the first voice telephony device coupled to the computer system while the computer system is coupled to the packet switched network over the first communications line.

19. The personal computer system of claim 18 further including a microphone and a speaker each coupled to the bus, wherein a first voice call may be conducted over the first communications line using the voice telephony device while a second voice call is concurrently conducted over the first communications line using the microphone and speaker, the first and second voice calls both capable of being conducted while the computer system is coupled to the first communications line.

20. The personal computer system of claim 18 further including a second voice telephony connection device coupled to the bus and configured to be coupled to a second voice telephony device and the first communications line, wherein a first voice call may be conducted over the first communications line using the first voice telephony device while a second voice call is concurrently conducted over the first communications line, the first and second voice calls both capable of being conducted while the computer system is coupled to the first communications line.

21. The personal computer system of claim 18 wherein the program further comprises:
- an audio device select code segment to select whether an incoming voice call is routed to the first voice telephony device or a microphone and speaker coupled to the computer system.

22. The personal computer system of claim 18 wherein the program further comprises:
- a hook detection code segment to detect when the first voice telephony device is enabled; and a dual tone multiple frequency (DTMF) detection code segment to detect a telephone number entered at the first voice telephony device, the phone call manager code segment further to place a voice call over the first communications line in response to the telephone number detected by the DTMF code segment while the personal computer system is coupled to the packet switched network over the first communications line.

23. A data storage medium having embodied thereon a program for execution by a processor, the program comprising:

a connection detection code segment to detect when a computer system is coupled to a packet switched network over a first communication line; and a phone call manager code segment to route voice calls to and from the first communications line through a first voice telephony device coupled to the computer system while the computer system is coupled to the packet switched network over the first communications line.

24. The data storage medium of claim 23 wherein the program further comprises:

an audio device select code segment to select whether a first voice call is to be conducted using the first voice telephony device or a second voice telephony device coupled to the computer system.

25. The data storage medium of claim 23 wherein the program further comprises:

a dual tone multiple frequency (DTMF) detection code segment to detect a telephone number entered at the first voice telephony device, the DTMF code segment to provide the telephone number to the computer system.

26. The data storage medium of claim 23 wherein the program further comprises:

a ring generation code segment to cause a notifying signal to be emitted from the first voice telephony device in response to an incoming voice call on the first communications line while the computer system is connected to the packet switched network on the first communications line.

27. The data storage medium of claim 23 wherein the program further comprises:

a hook detection code segment to detect when the first voice telephony device is enabled.

\* \* \* \* \*

UNITED STATES PATENT AND TRADEMARK OFFICE
CERTIFICATE OF CORRECTION

PATENT NO. : 6,597,687 B1
DATED : July 22, 2003
INVENTOR(S) : Rao

It is certified that error appears in the above-identified patent and that said Letters Patent is hereby corrected as shown below:

Column 5,
Line 3, delete "TCP/EP" and insert -- TCP/IP --.

Column 8,
Line 63, delete "demote" and insert -- remote --.

Signed and Sealed this

Twenty-third Day of March, 2004

JON W. DUDAS
*Acting Director of the United States Patent and Trademark Office*